Jan. 10, 1928.
A. H. HAWKINSON
SAW TOOTHED WOOD BORING BIT
Filed Feb. 20, 1926
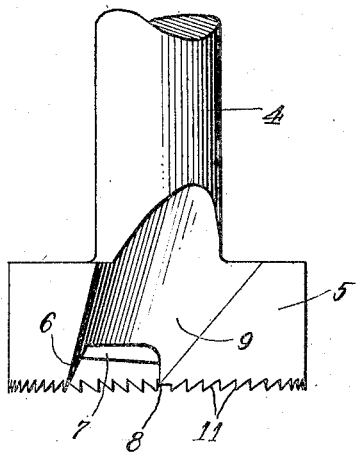
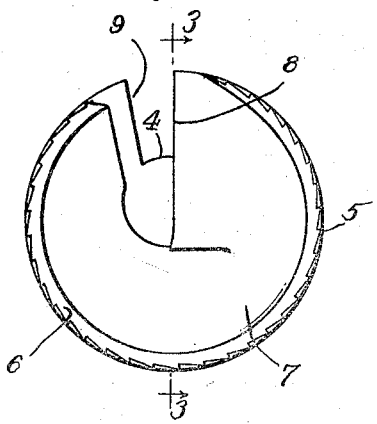
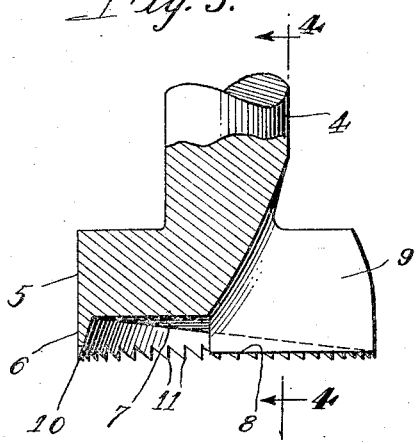
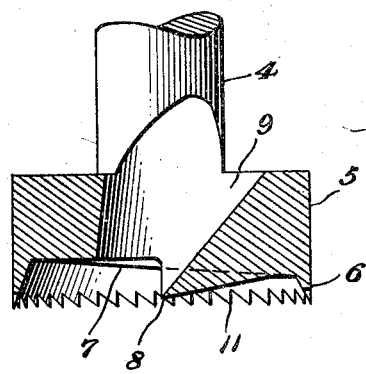
Inventor:
Adolph H. Hawkinson
By Wilson & McCanna
Attys.

Patented Jan. 10, 1928.

1,655,836

UNITED STATES PATENT OFFICE.

ADOLPH H. HAWKINSON, OF ROCKFORD, ILLINOIS, ASSIGNOR TO GREENLEE BROS. & CO., OF ROCKFORD, ILLINOIS, A CORPORATION OF ILLINOIS.

SAW-TOOTHED WOOD-BORING BIT.

Application filed February 20, 1926. Serial No. 89,578.

This invention relates to improvements in wood-boring bits.

The principal object of the invention is to provide a wood-boring bit having a saw-toothed circle-cutting edge for accurately guiding the bit and producing smooth, clean cut holes while at the same time making the boring less tedious.

A further object is to provide a bit of the character referred to having the cutting face thereof provided with a "back-off" formation receding from the cutting edge thereof to the chip opening to avoid the cutting of "washers" and to make the boring easier because of the fact that the chips are rendered less coarse and will not clog in the bit.

Another object is to provide the saw-toothed circle-cutting edge only slightly in leading relation to a radial cutting edge to serve somewhat in the nature of a pilot since no gimlet point is ordinarily provided on these bits, while, at the same time, avoiding the cutting of "washers" particularly at the bottom of blind holes by making the lead of the circle-cutting edge slight enough. The leading relation of the circle-cutting edge is also of advantage in avoiding the breaking out of splinters as the bit emerges from the back of the board.

A still further object is to provide a bit of the present type with a rearwardly flaring chip opening or slot to facilitate the passage of the chips therethrough and avoid choking thereof, thus also making for easier boring.

The invention is more clearly described in the following specification in which reference is made to the accompanying drawing, wherein—

Figure 1 is a side view of a wood-boring bit made in accordance with my invention;

Fig. 2 is a bottom side view of Fig. 1;

Fig. 3 is an axial cross-section taken on the line 3—3 of Fig. 2 looking in the direction indicated by the arrows; and Fig. 4 is a section transverse to the plane of Fig. 3 taken approximately on the line 4—4 thereof.

In the three views, the same reference numerals are applied to corresponding parts.

The bit comprises a shank 4 of any ordinary or usual form having a boring end 5 in the form of a cylindrical disk or head. The disk 5 is formed in a swaging or bulldozing operation to provide a circumferential rim 6 and a "backing off" face 7 receding circularly in approximately one complete spiral from a radial cutting edge 8 to the opposite side of a slot or chip opening 9 of which the cutting edge 8 forms one side. The "back-off" of the face 7 will be apparent particularly in Figs. 3 and 4. The form of the rim 6 will be seen in Figs. 1 and 3 to be tapered toward the peripheral cutting edge 10 which is filed to provide saw-teeth 11 to produce a saw-toothed circle-cutting edge. The tapering of the rim 6 toward the edge 10 gives the desired sharpness to the points of the saw-teeth 11 for incising and cutting while still affording the desired breadth at the base of the teeth for strength, as most clearly appears in Fig. 3. The saw-toothed circle-cutting edge 10 is slightly in leading relation to the radial cutting edge 8, as shown in Fig. 3 especially, and the slot 9 is flared rearwardly, as appears most clearly in Fig. 1.

In operation, the saw-toothed circle-cutting edge serves to guide the bit accurately particularly where a half round hole is being cut in the side of a board as, for example, when a half round recess is cut in the side of an automobile door frame to receive a half round buffer pad for the door. This, however, is only one instance where the bit may be used to very good advantage. In the boring of holes generally, the bit is accurately guided by the saw-toothed circle-cutting edge and a smooth, clean cut hole is produced having a perfect finish and, at the same time, the boring is far less tedious than with the ordinary Forstner type bits which were previously available. The "backing off" of the face of the bit prevents the cutting of "washers" which made boring quite tedious with the old type of bits. Washers are usually formed when the bit is emerging from the board and if, for example, a hole is being drilled through one board into another the washer formed as the bit is leaving the one board will set up a great deal of resistance if the bit is not conformed as herein disclosed so as to break up the washer. With the old type Forstner bit a washer could not be broken up but had to be crushed by heavy pressure brought to bear by the workman. If a washer tends to form with the present bit, the combined action of the pressure, twisting and shearing to which the wood is subjected due to the "backing off" from the cutting edge 8, breaks or chews up the washer into fine chips which have easy passage through the chip opening 9 and will not clog readily. The fact that the saw-toothed circle-cutting edge 10 is slightly in leading relation to the radial cutting edge 8 avoids the breaking out of splinters as the bit emerges from the back of the board and no furry edge is left at the hole. With other forms of bits of the present type, the tendency for the bit was to break through if no precaution was taken to back up the board where the hole was being made. The slight lead of the saw-toothed circle-cutting edge is, however, not sufficient to cut a washer at the bottom of a blind hole. An advantage in the rearward flaring of the slot or chip opening 9 is that the chips as they expand from their compressed condition on entering the slot tend more readily to go through the slot freely than to clog. It has been found that choking is entirely eliminated and much easier boring is the result. For certain types of work and with certain sizes of bits, I have found that a gimlet point may be used to advantage provided at the inner end of the radial cutting edge 8 and protruding out beyond the plane of the saw-toothed circle-cutting edge 10. However, since such an expedient is well known in the art, no invention is claimed therein.

It is believed that the foregoing conveys a clear understanding of the objects prefaced above, and while I have illustrated but a single working embodiment, it should be understood that considerable change might be made in the design and arrangement of the parts without departing from the spirit and scope of the invention as expressed in the appended claims.

I claim:

1. A wood-boring bit comprising a shank having thereon a cylindrical disk having a chip opening therethrough, a cutting edge in the face of said disk adjacent said opening, said disk having a "backing off" formation on its face receding in approximately one complete spiral from said cutting edge to the opposite side of said opening, and a circumferential rim on said disk provided with a peripheral circle-cutting edge.

2. A wood-boring bit comprising a shank having thereon a cylindrical disk having a chip opening therethrough, a radial cutting edge provided on the face of said disk at one side of said opening, said disk having a "backing off" formation on the face thereof receding circularly in approximately one complete spiral from said cutting edge to the opposite side of said opening, and a circumferential rim on said disk having a peripheral saw-toothed circle-cutting edge in a plane approximately parallel with said radial cutting edge.

In witness of the foregoing I affix my signature.

ADOLPH H. HAWKINSON.